US012621710B2

(12) United States Patent     (10) Patent No.: US 12,621,710 B2
Lee et al.     (45) Date of Patent: May 5, 2026

(54) METHOD AND APPARATUS FOR UPDATING AUTOENCODER FOR CHANNEL STATE INFORMATION FEEDBACK IN WIRELESS COMMUNICATION SYSTEM

(71) Applicant: Samsung Electronics Co., Ltd., Gyeonggi-do (KR)

(72) Inventors: Seunghyun Lee, Gyeonggi-do (KR); Hyeondeok Jang, Gyeonggi-do (KR); Suhwook Kim, Gyeonggi-do (KR); Wonjun Kim, Gyeonggi-do (KR); Changsung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 324 days.

(21) Appl. No.: 18/335,633

(22) Filed: Jun. 15, 2023

(65) Prior Publication Data

US 2023/0413109 A1     Dec. 21, 2023

(30) Foreign Application Priority Data

Jun. 15, 2022    (KR) ........................ 10-2022-0073059

(51) Int. Cl.
    *H04W 28/06*       (2009.01)
    *H04W 24/10*       (2009.01)
(52) U.S. Cl.
    CPC ........... *H04W 28/06* (2013.01); *H04W 24/10* (2013.01)
(58) Field of Classification Search
    None
    See application file for complete search history.

(56) References Cited

U.S. PATENT DOCUMENTS

| | | | |
|---|---|---|---|
| 2018/0049188 A1 | 2/2018 | Kim et al. | |
| 2018/0367192 A1* | 12/2018 | O'Shea | ................. G06N 3/044 |
| 2021/0050895 A1 | 2/2021 | Kang et al. | |
| 2021/0066763 A1 | 3/2021 | Seon et al. | |
| 2021/0067294 A1* | 3/2021 | Farmanbar | ........... H04L 5/0055 |
| 2021/0195462 A1* | 6/2021 | Pezeshki | ................ G06N 3/088 |
| 2021/0266763 A1* | 8/2021 | Yoo | ........................ H04W 24/02 |
| 2021/0273707 A1 | 9/2021 | Yoo et al. | |
| 2022/0052827 A1 | 2/2022 | Vitthaladevuni et al. | |
| 2022/0060917 A1 | 2/2022 | Vitthaladevuni et al. | |

(Continued)

FOREIGN PATENT DOCUMENTS

| | | |
|---|---|---|
| CN | 113922936 | 1/2022 |
| KR | 10-1878300 | 8/2018 |

(Continued)

OTHER PUBLICATIONS

Ericsson, "General Aspects of AI PHY", R1-2203280, 3GPP TSG-RAN WG1 Meeting #109-e, May 16-27, 2022, 19 pages.

(Continued)

*Primary Examiner* — Brian S Roberts
(74) *Attorney, Agent, or Firm* — The Farrell Law Firm, P.C.

(57) ABSTRACT

Disclosed is a method by which a base station (BS) updates an autoencoder (AE) for channel state information (CSI) feedback in a wireless communication system, including transmitting, to a user equipment (UE), a data collect instruction message instructing to collect data before compression corresponding to compressed data, receiving data before the compression from the UE, and updating an AE, based on the received data before compression.

19 Claims, 11 Drawing Sheets

(56)     References Cited

U.S. PATENT DOCUMENTS

| | | | |
|---|---|---|---|
| 2022/0070822 A1 | 3/2022 | Behboodi et al. | |
| 2022/0131589 A1 | 4/2022 | Li et al. | |
| 2023/0089393 A1 | 3/2023 | O'Shea et al. | |
| 2023/0103220 A1* | 3/2023 | Pezeshki | H04B 7/08 |
| | | | 370/329 |
| 2023/0409963 A1* | 12/2023 | Narayanan Thangaraj | |
| | | | G06N 3/084 |
| 2024/0204963 A1 | 6/2024 | Liu et al. | |

FOREIGN PATENT DOCUMENTS

| | | | |
|---|---|---|---|
| KR | 10-2039640 | 11/2019 | |
| KR | 10-2021-0122798 | 10/2021 | |
| KR | 10-2310001 | 10/2021 | |
| WO | WO 2020/167223 | 8/2020 | |
| WO | WO 2020/180221 | 9/2020 | |
| WO | WO 2022/086949 | 4/2022 | |
| WO | WO-2023164364 A1 * | 8/2023 | H04W 24/10 |

OTHER PUBLICATIONS

Qualcomm Incorporated, "Other Aspects on AI/ML for CSI Feedback Enhancement", R1-2205025, 3GPP TSG-RAN WG1 Meeting #109-e, May 9-20, 2022, 6 pages.
International Search Report dated Sep. 19, 2023 issued in counterpart application No. PCT/KR2023/008292, 10 pages.
European Search Report dated Jul. 28, 2025 issued in counterpart application No. 23824249.9-1206, 14 pages.

* cited by examiner

METHOD AND APPARATUS FOR UPDATING AUTOENCODER FOR CHANNEL STATE INFORMATION FEEDBACK IN WIRELESS COMMUNICATION SYSTEM

CROSS-REFERENCE TO RELATED APPLICATION

This application is based on and claims priority under 35 U.S.C. § 119 to Korean Patent Application No. 10-2022-0073059, filed on Jun. 15, 2022, in the Korean Intellectual Property Office, the disclosure of which is incorporated by reference herein in its entirety.

BACKGROUND

1. Field

The disclosure relates generally to a wireless communication system, and more particularly, to a method and apparatus for updating an artificial intelligence (AI) model included in an autoencoder (AE) for compression of channel state information (CSI) data.

2. Description of Related Art

In the process of radio communication development, technologies for human-targeted services such as voice, multimedia, and data have been developed. Connected devices that are exponentially rising after commercialization of fifth-generation (5G) communication systems are expected to be connected to communication networks. As examples of things connected to networks, there may be cars, robots, drones, home appliances, displays, smart sensors installed in various infrastructures, construction machinery, and factory equipment. Mobile devices are expected to evolve to various form factors such as augmented reality (AR) glasses, virtual reality (VR) headsets, and hologram devices. To provide various services by connecting hundreds of billions of devices and things in the sixth-generation (6G) era, there are ongoing efforts to develop better 6G communication systems, which are referred to as beyond-5G systems.

In the 6G communication system expected to become a reality by around 2030, a maximum transfer rate is tera bits per second (bps), i.e., 1000 giga bps, and a maximum wireless delay is 100 microseconds ($\mu$sec). In other words, compared to the 5G communication system, the transfer rate becomes 50 times faster and the wireless delay is reduced to a tenth ($\frac{1}{10}$) in the 6G communication system.

To attain these high data transfer rates and the ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, is expected to increase. As major technologies for securing coverage, radio frequency (RF) elements, antennas, new waveforms superior to orthogonal frequency division multiplexing (OFDM) in terms of coverage, beamforming and massive multiple-input and multiple-output (MIMO), full dimensional MIMO (FFD-MIMO), array antennas, multiple antenna transmission technologies such as large-scale antennas need to be developed. New technologies for increasing coverage of THz band signals, such as metamaterial-based lenses and antennas, a high-dimensional spatial multiplexing technique using orbital angular momentum (OAM), and reconfigurable intelligent surface (RIS) are being discussed.

To enhance frequency efficiency and system networks, a full duplex technology by which both uplink (UL) and downlink (DL) transmissions concurrently use the same frequency resource, a network technology that comprehensively uses satellite and high-altitude platform stations (HAPS), etc., a network structure innovation technology supporting mobile base stations (BSs) and allowing optimization and automation of network operation, a dynamic spectrum sharing technology through collision avoidance based on spectrum usage prediction, an AI based communication technology to realize system optimization by using AI from the designing stage and internalizing an end-to-end AI supporting function, and a next generation distributed computing technology to realize services having complexity beyond the limit of terminal computing capability by using ultrahigh performance communication and computing resources (e.g., mobile edge computing (MEC) cloud) are being developed in the 6G communication system. By designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience are realized through hyper-connectivity of the 6G communication system including not only connections between things but also connections between humans and things. In particular, it is predicted that services such as truly immersive extended reality (XR), high-fidelity mobile hologram, and digital replica may be provided. Further, services such as remote surgery, industrial automation and emergency response with enhanced security and reliability may be provided through the 6G communication system to be applied in various areas such as industry, medical care, vehicles, and appliances.

In the prior art, however, the datasets that are acquired are faulty from a tuning standpoint and CSI data compression is excessively errant. Therefore, there is a need in the art for a method and apparatus ensuring CSI data compression performance when fine tuning an AI model included in an AE and to reduce an error in CSI data compression.

SUMMARY

Accordingly, the present disclosure provides embodiments that are designed to address at least the problems and/or disadvantages described above and to provide at least the advantages described below.

An aspect of the disclosure is to provide a technology to obtain a dataset required for a BS to fine-tune an AI model included in an AE for compression of CSI data.

Another aspect of the disclosure is to provide a technology to ensure CSI data compression performance when fine tuning an AI model included in an AE by a BS instructing a user equipment (UE) to use an encoder model with more bits of compressed data (z data) while the AI model is fine-tuned, or to reduce an error of CSI data compression by the BS instructing the UE to report codebook-based CSI without compressing the CSI data.

Another aspect of the disclosure is to provide a method and apparatus for updating an AI model in an AE for CSI compression in a wireless communication system, whereby the BS may obtain, from the UE, a dataset before compression required for fine tuning the AI model included in the AE for CSI compression.

In accordance with an aspect of the disclosure, a method by which a BS updates an AE for CSI feedback in a wireless communication system includes transmitting a data collect instruction message instructing a UE to collect data before compression corresponding to compressed data, receiving the data before the compression from the UE, and updating the AE, based on the data received before the compression.

In accordance with an aspect of the disclosure, a BS for updating an AE for CSI feedback includes a transceiver and at least one processor. The at least one processor may be configured to transmit, to a UE through a transceiver, a data collect instruction message instructing to collect data before compression corresponding to compressed data, receive, from the UE through the transceiver, the data before the compression, and update the AE, based on the data received before the compression.

In accordance with an aspect of the disclosure, a method by which a UE communicates with a BS for updating an AE for CSI feedback in a wireless communication system includes receiving, from the BS, a data collect instruction message instructing the UE to collect data before compression corresponding to compressed data, creating the compressed data, transmitting the data before the compression to the BS, and receiving, from the BS, an AE updated based on the data collected before compression.

In accordance with an aspect of the disclosure, a UE for communicating with a BS for updating an AE for CSI feedback in a wireless communication system includes a transceiver and at least one processor, wherein the at least one processor is configured to receive, from the BS through the transceiver, a data collect instruction message instructing to collect data before a compression corresponding to compressed data, create the compressed data, transmit, to the BS through the transceiver, the data before the compression, and receive, from the BS through the transceiver, an AE updated based on the data before the compression.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
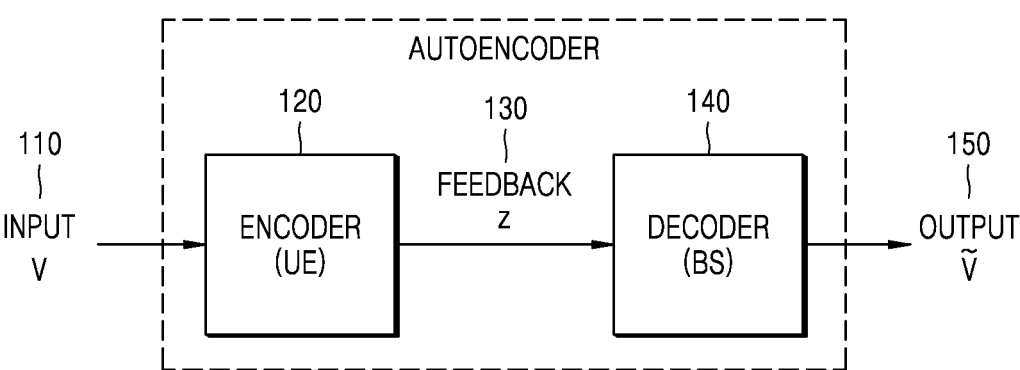
FIG. 1 illustrates an AE for CSI compression, according to an embodiment.

Embodiments of the disclosure will now be described in detail with reference to accompanying drawings.

Description of technological content well-known in the art or not directly related to the disclosure will be omitted for the sake of clarity and conciseness. The terms used herein are defined by considering functionalities in the disclosure but may vary depending on practices or intentions of users or operators. Accordingly, the terms should be defined based on descriptions throughout this specification.

For the same reason, some parts in the accompanying drawings may be exaggerated, omitted or schematically illustrated. The size of the respective elements may not fully reflect their actual size. Like numbers refer to like elements throughout the drawings.

The embodiments of the disclosure may be embodied in various forms and should not be construed as limited to the embodiments set forth herein; rather, these embodiments are provided so that this disclosure will be thorough and complete, and will fully convey the scope of the disclosure to those of ordinary skill in the art. Like numbers refer to like elements throughout the specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

A BS herein may refer to an entity for performing resource allocation for a UE and may be at least one of a gNode B, eNode B, Node B (or xNode B, where x represents any letter including 'g' and 'e'), a radio access unit, a BS controller, a satellite, an airborne vehicle or a node in a network. A UE may include a mobile station (MS), a vehicle, a satellite, an airborne vehicle, a cellular phone, a smart phone, a computer, or a multimedia system having a communication function. A DL herein may refer to a radio transmission path for a signal transmitted from a BS to a UE, and a UL may refer to a radio transmission path for a signal transmitted from a UE to a BS. In addition, there may be a sidelink (SL) that refers to a radio transmission path for a signal transmitted from a UE to another UE.

Although the embodiments herein will be focused on long-term evolution (LTE), LTE-Advanced (LTE-A) or a 5G system as an example, they may be applied to other communication systems with similar technical backgrounds or channel types. For example, the other communication systems may include a 5G-Advanced, new radio (NR)-Advanced or 6G mobile communication technology developed after the 5G mobile communication technology (or NR), and the term 5G includes the existing LTE, LTE-A and other similar services. Embodiments of the disclosure will also be applied to different communication systems with some modifications to such an extent that does not significantly deviate the scope of the disclosure when considered by those of ordinary skill in the art.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments of the disclosure, the module may include one or more processors.

In the following description, for convenience of explanation, terms and definitions used in the most recent standards among the currently existing communication standards, i.e., in the LTE and NR standard defined in the 3rd generation partnership project (3GPP) will be used. The disclosure is not, however, limited to the terms and definitions, and may be equally applied to any systems that conform to other standards.

FIG. 1 illustrates an AE for CSI compression, according to an embodiment.

The beyond-LTE communication systems require support for a service that may freely reflect various requirements of the user and the service provider. Services considered for the beyond-5G communication system may include enhanced mobile broad band (eMBB), massive machine type communication (mMTC), and ultra-reliability low latency communication (URLLC). Beam management or support for various frequency bands is required to satisfy various services. In this case, there may be a different channel condition for each frequency band or beam, and vast resources are consumed in the process of a UE estimating and reporting a channel state to a BS. To reduce this resource consumption, a CSI compression technology and a method by which to compress and transmit the compressed CSI is being discussed.

CSI reconstructed by codebook-based CSI feedback may cause information loss in the process of transferring an estimated channel H due to quantization issue of the codebook. For example, when the BS transmits a reference signal (RS) to the UE, the UE may estimate a channel state based on the received RS to obtain channel $\hat{H}$, and obtain a relation of $\hat{H} = UDV^H$ in a method such as eigen value decomposition (EVD) or a singular value decomposition. The channel $\hat{H}$ may be obtained when a value of V is known from the obtained relation, so the UE transmits, to the BS, a precoding matrix indicator (PMI), an index of the most similar codebook to the value of V in the codebook-based CSI feedback. In the case of transmitting, to the BS, the index of the similar codebook to the value of V instead of the value of V, there may be an error due to a difference between the preset codebook and an actual value of V. When the codebook is configured more variously to reduce the information loss due to the difference between the preset codebook and the actual value of V, the amount of data to be transmitted may increase accordingly.

In a case of CSI feedback based on a CSI compression technology, the UE (a transmitting end) may compress the CSI data (V data) through an encoder and transmit the compressed CSI data, and the BS may decode or reconstruct the received compressed CSI data (z data) through a decoder to obtain reconstructed CSI data (V data).

Referring to FIG. 1, an AE for CSI compression includes an encoder 120 on the UE side and a decoder 140 on the BS side. The encoder 120 and the decoder 140 may each include an AI model. For example, an encoder AI model included in the encoder 120 may be used for compressing CSI data (V data) 110 to create compressed data (feedback data or z data) 130. A decoder AI model included in the decoder 140 may be used for decoding or reconstructing the compressed data 130 received from the UE to create reconstructed CSI data ($\tilde{V}$ data) 150.

The AI model has performance that deteriorates when the task or the characteristics of input data change from a trained dataset and an environment. When the performance of the AI model deteriorates, the AI model may be replaced by another AI model that suits the characteristics of the input data or the environment, the AI model may be retrained, or fine tuning may be performed on some layer of the AI model.

Fine tuning the AI model may refer to further retraining the model according to a change in characteristics of the dataset or the environment in deployment of the AI model. For example, the fine tuning may include further training the AI model by using a fewest number of weights for a downstream task in addition to all the weights used for pre-training of the AI model. The downstream task is to be finally attained through the AI model.

To decode the compressed data 130 created by compressing (encoding) the data before compression (V data) 110, the data before compression (V data) needs to be obtained. Hence, fine tuning the AI model may be performed in a manner that compares the reconstructed CSI data ($\tilde{V}$ data)

150 obtained by decoding the compressed data (z data) 130 with the CSI data before compression (V data) 110.

The BS having the decoder 140 may have more computing resources than the UE. Hence, training or fine tuning of the AI model may be more efficient when performed in the BS which is a stage of the decoder 140.

In the meantime, the data before compression (V data) 110 required in the operation of fine tuning the AI model is created on the UE side and is not stored in the stage of the decoder 140 of the BS side. The UE for transmitting the compressed CSI data (z data) 130 to the BS may create the compressed data (z data) 130 based on the CSI data (V data) and then logically delete the unnecessary CSI data before compression (V data). Hence, even when the BS determines that fine tuning of the AI model is required and requests the UE to transmit data before compression (V data), the BS may obtain only the newest piece of data before compression (V data). In other words, as the BS needs to train the AI model only with a limited value of V, the AI model may be excessively fitted for the limited value of V or features with which the AI model has been trained may disappear before fine tuning (catastrophic forgetting).

Hence, the BS is unable to create a dataset that represents improved features of the coverage cell unless the UE creates the compressed data (z data) and stores the corresponding data before compression (V data), in which case, the BS may not effectively train the AI model in performing the fine tuning, and is thus unable to operate an environment-adaptive CSI compression system.

To fine-tune the AI model of an AE for CSI compression, the BS may instruct the UE to collect data before compression (V data) corresponding to the compressed data (z data), request the UE to transmit the collected data before compression (V data), and receive the data before compression (V data) from the UE. The BS may update the AI model on the decode stage (referred to as a decoder AI model) based on the data before compression (V data) received from the UE. The BS may update the AI model on the encoder stage (referred to as an encoder AI model). After updating the encoder AI model, the BS may transmit the updated encoder AI model to the UE.

Accordingly, the BS may update the AI model included in the AE by requesting the UE to collect data before compression (V data) that represents better features of the coverage cell served by the BS.

Figure 2:
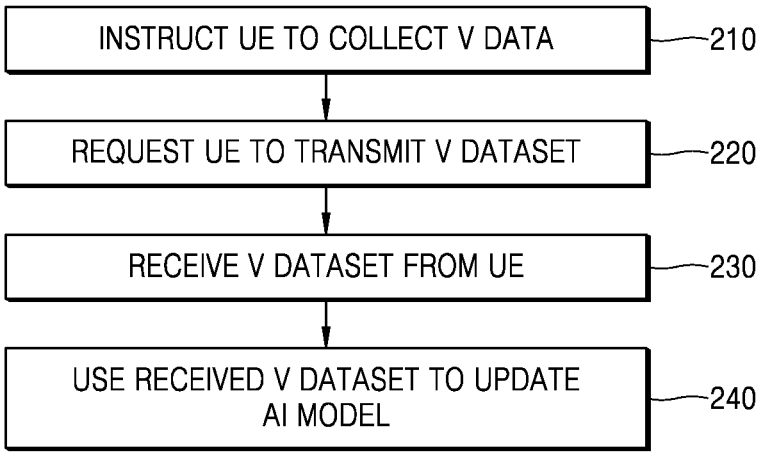
FIG. 2 illustrates a method by which a BS updates an AI of an AE for CSI compression in a wireless communication system, according to an embodiment.

FIG. 2 illustrates a method by which a BS updates an AI model of an AE for CSI compression in a wireless communication system, according to an embodiment.

The BS may update an AE for CSI feedback. For example, the BS may update the decoder AI model for decoding compressed CSI data.

In step 210, the BS instructs the UE to collect data before compression (V data) corresponding to the compressed data (z data). For example, the BS transmits, to the UE, a data collect instruction message instructing to collect data before compression corresponding to compressed data.

The data collect instruction message may be transmitted to the UE when it is determined based on cell-specific information that there is a change in channel characteristics.

The data collect instruction message may include an indicator including identification information of data before compression to be collected and may be transmitted to the UE in a physical DL control channel (PDCCH).

The BS may determine a data collection interval based on a degree of changing of channel characteristics over time.

The data collect instruction message may include data collection interval information and may be transmitted to the UE by RRC signaling.

The data collect instruction message may include a data transmission request message requesting the UE to transmit data before compression collected immediately after the data before compression is collected.

The data collect instruction message may include a data store instruction message instructing the UE to store the collected data before compression. Afterward, the BS may transmit the data transmission request message requesting the UE to transmit at least one piece of data before compression.

In step 220, the BS may request the UE to transmit the collected data before compression (V data). However, operation 220 may be omitted.

In step 230, the BS receives data before compression (data-before-compression, V data) from the UE.

In step 240, the BS updates the AE based on the received data before compression. The AE may include a first encoder AI model for compressing CSI data and a decoder AI model for reconstructing the compressed CSI data. The BS updating the AE may include fine tuning at least one of the first encoder AI model or the decoder AI model.

The BS may transmit, to the UE, AE update start time information, duration information of the updating, and identification information for a second encoder AI model to be used for a period during which the AE updating is performed.

The BS may transmit, to the UE, AE update start time information, duration information of the updating operation, and identification information for a codebook to be used for a period during which the AE updating is performed.

As such, the BS may obtain data required for fine tuning at least one AI model included in the AE for CSI compression.

Figure 3:
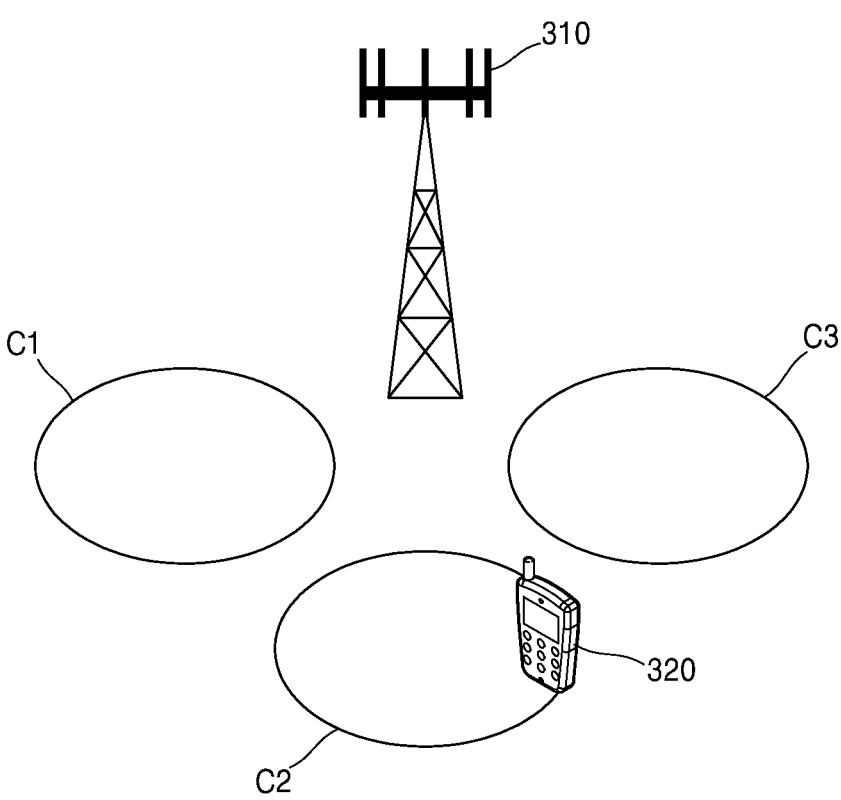
FIG. 3 illustrates an operation of a BS requesting a UE to collect data before compression, according to an embodiment.

FIG. 3 illustrates an operation of a BS 310 requesting a UE 320 to collect data before compression (V data), according to an embodiment.

The BS 310 may request the UE 320 to collect data before compression (V data) based on cell-specific information. For example, the BS 310 may determine to update the AE when determining that there is a change in channel characteristics based on the cell-specific information and request the UE 320 to collect data before compression (V data) to update the AE.

The cell-specific information may be set in advance and stored in the BS 310. For example, the cell-specific information may be a fixed value set as channel characteristic information determined by a field test when the BS 310 is installed. for example, the cell-specific information may refer to cell-specific channel characteristic information including channel characteristic information corresponding to a particular cell, or channel characteristic information corresponding to a particular position in the cell. The cell-specific information may be a value updated in real time based on the CSI data (V data) collected by a plurality of UEs 320 connected to the cell.

A specific point of time or specific condition in which the BS 310 requests the UE 320 to collect data before compression (V data) (or in which the BS 310 determines to update the AE) may be determined based on the cell-specific information in various methods.

Areas in a particular cell may be clustered based on channel characteristics or blockage characteristics. Referring to FIG. 3, cell areas corresponding to the BS 310 may be clustered into a first cluster C1, a second cluster C2, and a third cluster C3. The UE 320 connected to the BS 310 is able to freely move in the cell areas, and the BS 310 may request the UE 320 to collect data before compression (V data) for a CSI-RS over K slots when the UE 320 moves from one cluster to another cluster, where K is a natural number equal to or greater than 1.

For example, the UE 320 may be located in the second cluster C2 and may then move to an area corresponding to the third cluster C3. In this case, the BS 310 may request the UE 320 to collect data before compression (V data) for the CSI-RS over K slots from a point of time when the UE 320 enters the third cluster C3.

The BS 310 may request the UE 320 to collect data before compression (V data) only when the UE 320 enters a new cluster in which the UE 320 has not been located. For example, when the UE 320 moves in the order of the second cluster C2, the third cluster C3, the second cluster C2 and the first cluster C1, the BS 310 may not request the UE 320 to collect data before compression (V data) when the UE 320 moves from the third cluster C3 to the second cluster C2.

The BS 310 may determine a channel characteristic change interval by monitoring a state of the UE 320 such as moving speed, a frequency band, or RS received power (RSRP) of the UE 320, and request the UE 320 to collect data before compression (V data) according to the determined channel characteristics change interval. For example, the BS 310 may determine from a history of state changes of the UE 320 that channel characteristics are changed about every 100 milliseconds (ms), in which case the BS 310 may request the UE 320 to collect data before compression (V data) every 100 ms.

When the BS 310 communicates with the UE 320 and the communication performance sharply deteriorates, the BS 310 may request the UE 320 to collect data before compression (V data) in various manners that are not limited to the aforementioned embodiments of the disclosure.

Figure 4:
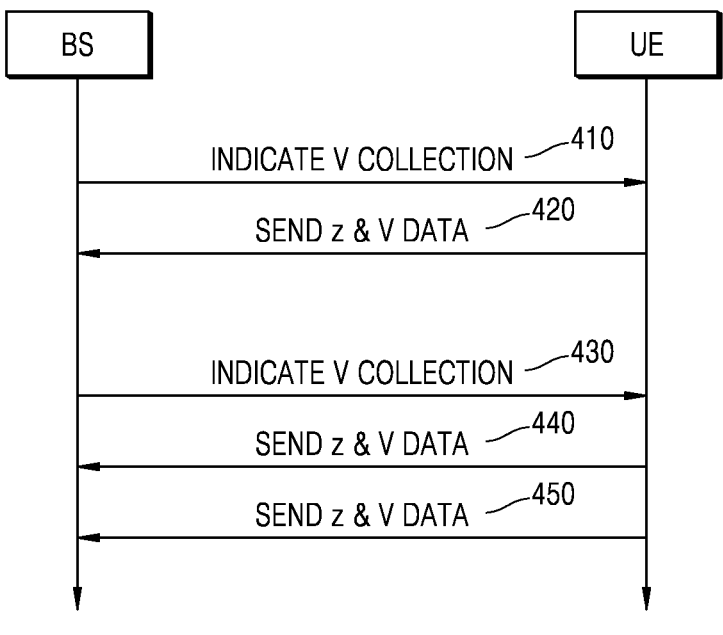
FIG. 4 illustrates an operation of a UE transmitting data before compression to a BS together with compressed data, according to an embodiment.

FIG. 4 illustrates an operation of a UE transmitting data before compression (V data) to a BS together with compressed data (z data), according to an embodiment.

The UE may transmit data before compression (V data) to the BS as soon as the UE collects the data by creating compressed data (z data) based on the data before compression (V data) and then transmitting the created compressed data (z data) and the data before compression (V data) to the BS simultaneously without delay or sequentially. In this case, it is advantageous for the UE not to separately store the data before compression (V data) and the BS is able to quickly use the received data before compression (V data). In the meantime, when the BS does not update the AE immediately, the BS may be burdened to identify, store and manage data before compression (V data) received from each of the plurality of UEs and may not easily perform flexible scheduling on resources for receiving the data before compression (V data).

Referring to FIG. 4, in step 410, the BS may request the UE to collect data before compression (V data) and also request the UE to immediately transmit the collected data before compression (V data).

In step 420, when receiving the request to collect data before compression (V data) and transmit the data without delay, the UE may create compressed data (z data) by compressing (encoding) the V data after obtaining the CSI data (V data) and transmit the z data and the V data before compression to the BS altogether or sequentially.

In step 430, the BS may request the UE to collect data before compression (V data) again and immediately request the UE to transmit the collected data before compression (V data).

data). The BS may set a time interval for the UE to collect the data before compression (V data).

In steps 440 and 450, when receiving the request to collect the data before compression (V data) for a certain time interval and transmit the data without delay, the UE may create compressed data (z data) by compressing (encoding) the CSI data obtained in the time interval and transmit the z data and the corresponding V data before compression to the BS altogether or sequentially.

Figure 5:
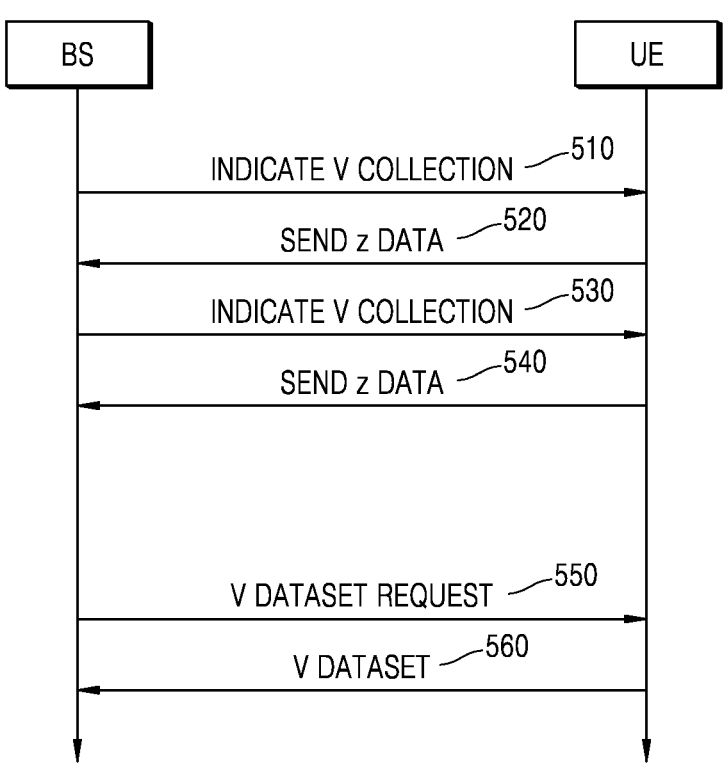
FIG. 5 illustrates an operation of a UE transmitting data before compression to a BS at an additional request from the BS, according to an embodiment.

FIG. 5 illustrates an operation of a UE transmitting data before compression to a BS at an additional request of the BS, according to an embodiment.

The UE may have stored the data before compression (V data) in a memory and then may transmit the data to the BS at the additional request of the BS. For example, the UE may assemble the collected data before compression (V data) together into the form of a dataset and transmit the assembled dataset to the BS. In this case, the BS may request data before compression (V data) as needed, and is not burdened to identify, store or manage the data before compression (V data) received from each UE. In the meantime, the UE needs to store the data before compression (V data) until transmitting the data to the BS, so the UE may be burdened to allocate and manage a storage space.

Referring to FIG. 5, in step 510, the BS may request the UE to collect data before compression (V data) and also request the UE to store the collected data before compression (V data) until receiving an additional request for the data.

In step 520, when receiving the request to collect and store data before compression (V data), the UE may create compressed data (z data) by compressing (encoding) the V data after obtaining the CSI data (V data), transmit the z data to the BS, and store the V data before compression in the memory.

In step 530, the BS may request the UE to collect data before compression (V data) again and also request the UE to store the collected data before compression (V data) until receiving an additional request. The BS may set a time interval for the UE to collect the data before compression (V data).

In step 540, when receiving the request to collect and store the data before compression (V data) in a certain time interval, the UE may create compressed data (z data) by compressing (encoding) CSI data (V data) obtained in the time interval, transmit the z data to the BS, and store the V data before compression in the memory.

In step 550, the BS may request the UE to transmit data before compression (V data).

In step 560, when receiving the request to transmit data before compression (V data), the UE may transmit all pieces of data before compression, which are stored, to the BS altogether or sequentially. When having stored the data before compression (V data) and transmitting the data at an additional request of the BS, information and index of the data before compression (V data) may be shared between the BS and the UE in the form of metadata. For example, a V dataset including at least one piece of data before compression may have the form as shown below in Table 1.

TABLE 1

| Index | Timestamp (min:sec:msec) | RS Type | # of Subbands | Freq. (GHz) | Cluster # |
|-------|--------------------------|---------|---------------|-------------|-----------|
| 1 | 10:25:325 | CSI-RS | 13 | 3.2 | 2 |
| 2 | 10:25:335 | CSI-RS | 13 | 3.2 | 3 |

TABLE 1-continued

| Index | Timestamp (min:sec:msec) | RS Type | # of Subbands | Freq. (GHz) | Cluster # |
|---|---|---|---|---|---|
| 3 | 10:25:825 | CSI-RS | 26 | 2.7 | 2 |
| 4 | 10:26:025 | CSI-RS | 26 | 3.2 | 2 |

Referring to Table 1, the V dataset may include various information such as indexes, frequency and timestamps of data, the RS type for the data before compression, which cell area (cluster #) the data corresponds to, and the location in the cell to which the data corresponds.

When receiving the compressed data (z data), the BS may have index information for the data before compression (V data) stored in the UE. When requesting the UE to transmit data before compression (V data), the BS may request the UE to transmit all V datasets stored or one or more pieces of data before compression (V data) corresponding to a particular index value or some index values. The data before compression (V data) that the BS requests the UE to transmit may be determined according to a priority of the corresponding V data in the V dataset, which priority may indicate an importance level of the V data for an AI model updating operation of the AE.

Weights may be set for a plurality of pieces of data before compression (V data) stored in the UE. The weight set for the data before compression (V data) may indicate an importance level of the V data for an AI model updating operation of the AE.

For example, the weight of the data before compression (V data) may be determined based on the time stamp. CSI data obtained more recently may have a higher weight than previously obtained CSI data. Referring to Table 1, V data corresponding to index #4 may have the highest weight, and V data corresponding to index #1 may have the lowest weight.

For example, the weight of the data before compression (V data) may also be determined based on the corresponding cell area (cluster). CSI data obtained in a cell area where the UE has not been located may have a high weight as compared to CSI data obtained in a cell area with known channel information. Referring to Table 1, V data corresponding to index #2 may have a higher weight than V data corresponding to other indexes.

Figure 6:
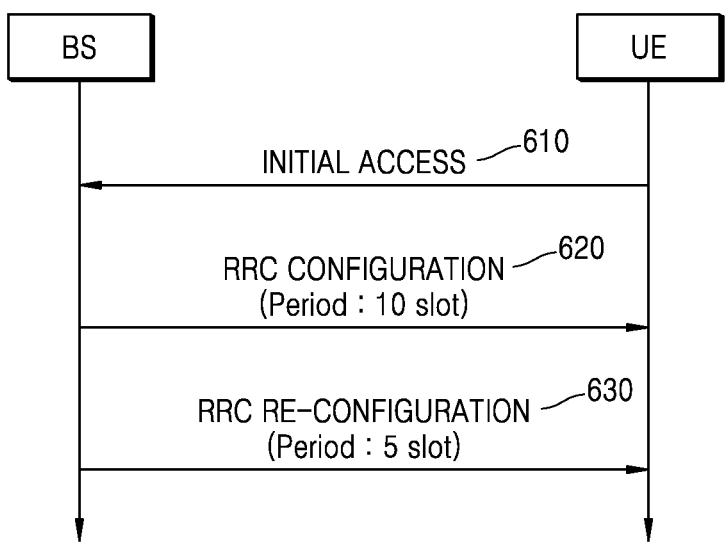
FIG. 6 illustrates an operation of requesting periodic collection of data before compression by radio resource control (RRC) signaling, according to an embodiment.

FIG. 6 illustrates an operation of requesting periodic collection of data before compression by RRC signaling, according to an embodiment.

The operation of the BS requesting the UE to collect data before compression (V data) may be implemented not only in a manner that triggers data collection through the aforementioned additional message but also in a manner that sets a collection interval of data before compression (V data) by RRC signaling. The method of setting a data collection interval by RRC signaling may reduce signal overhead because no additional message is sent as compared to the triggering method.

The data collection interval may be determined according to a degree of changing of channel characteristics and may be reset by RRC reconfiguration. A change in channel characteristics may be made even when there is a change in condition in the cell such as a physical change in the environment in the cell.

Referring to FIG. 6, in step 610, the UE may make an initial access to the BS. In step 620, the BS may set 10 slots for the collection interval of data before compression (V data) by RRC signaling to the UE. Afterward, when it is determined that a channel state change interval significantly decreases, the BS may change the collection interval of data before compression (V data) into 5 slots by RRC signaling to the UE in step 630. The UE transmitting the collected data before compression (V data) to the BS may be performed similarly to the aforementioned method in FIGS. 4 and 5.

Although FIG. 6 is directed to setting an interval during which the UE collects data before compression (V data) by RRC signaling, the interval for collecting data before compression (V data) may alternatively be set for the UE through a medium access control (MAC) control element (CE) (MAC CE).

Part of data before compression (V data) collected and stored in the UE may no longer be used for updating the AE due to a channel state change. In this case, the BS may request the UE to delete V data corresponding to the corresponding index. The BS may set a valid period (or timer) for the collected V data to delete the data when the valid period ends.

Figure 7:
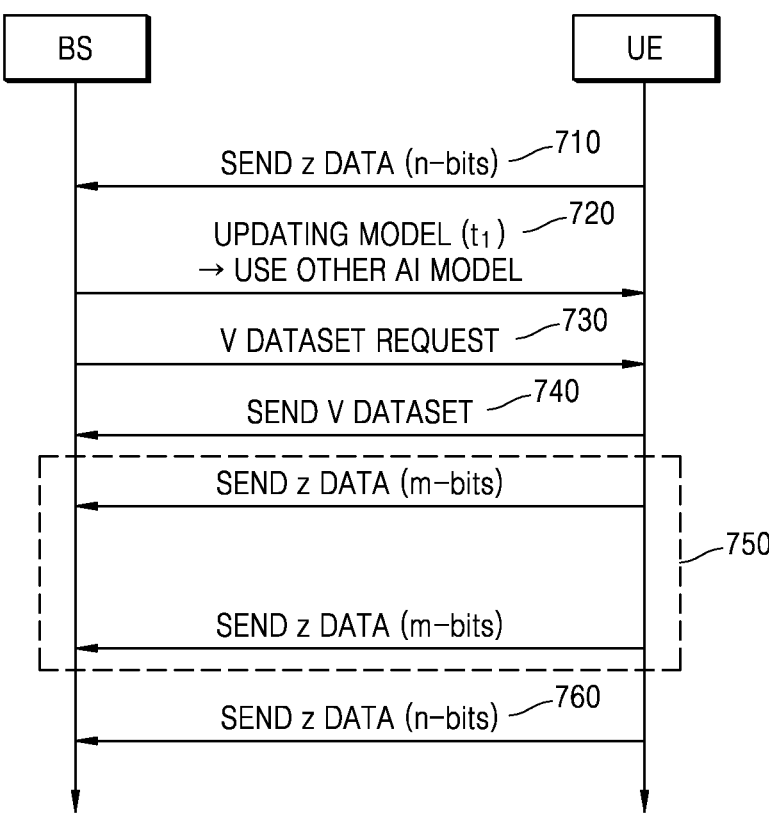
FIG. 7 illustrates an operation of a BS requesting a UE to use another encoder AI model with more bits of compressed data during fine tuning of an AI model included in an AE, according to an embodiment.

FIG. 7 illustrates an operation of a BS requesting a UE to use another encoder AI model with more bits of compressed data (z data) during fine tuning of an AI model included in an AE, according to an embodiment.

When an AI model included in the AE is required to be updated due to deterioration of AE performance, a technique for ensuring performance of CSI feedback while the AI model is being updated (fine-tuned) is required.

In step 710, before the BS determines to update the AE, the UE may use a first encoder AI model that compresses CSI data (V data) into n bits to create compressed data (z data), and transmit the n-bit compressed data to the BS.

After a change in environment, the BS may determine to update the AE. since compression and reconstruction performance while the AE is being updated is difficult to ensure, a 1-bit deactivate indicator to deactivate the existing model may be transmitted while the AE is being updated. For example, when the deactivate indicator is 0, this indicates that the existing model in use remains to be used, whereas when deactivate indicator is 1, this indicates that the existing model in use may no longer be used.

In step 720, as the BS determines to update the AE, the BS may indicate to the UE that the updating will be performed for time $t_1$, and request the UE to use a second encoder AI model which is different from the first encoder AI model to create compressed data (z data). The second encoder AI model may compress CSI data (V data) into m bits, where m may be a number larger than n (m>n).

In step 730, the BS may request the UE to transmit data before compression (V data) to update the AE. Operation 730 may correspond to operation 550 as described above in connection with FIG. 5.

In step 740, when receiving the request to transmit data before compression (V data), the UE may transmit all pieces of data before compression, which are stored, to the BS altogether or sequentially. Operation 740 may correspond to operation 560 as described above in connection with FIG. 5.

In step 750, the UE may use the second encoder AI model that compresses CSI data (V data) into m bits to create compressed data (z data) at the request of the BS in step 720, and transmit the m-bit compressed data to the BS for time $t_1$ during which the AE is being updated.

In step 760, when time $t_1$ has elapsed or the UE receives an additional resume request from the BS, the UE may reuse the first encoder AI model that compresses CSI data (V data) into n bits to create compressed data (z data), and transmit the n-bit compressed data to the BS. In this case, the first encoder AI model may be equal to the first encoder AI model in step 710, or the first encoder AI model updated by the BS in the process of fine tuning the AE.

As such, while the AI model included in the AE is being fine-tuned, the BS may instruct the UE to use an encoder model with more bits of compressed data (z data) to ensure CSI compression performance during the fine-tuning duration of the AI model.

As the BS determines to update the AE, the BS may indicate to the UE that the BS is going to perform updating for time $t_1$, and request the UE to perform CSI feedback in the codebook method instead of the CSI compression method during the updating. Codebook information may be stored in the BS and the UE to perform the codebook-based CSI feedback. The UE may report CSI to the BS in the codebook method for time $t_1$ during which the AE is being updated. When time $t_1$ has elapsed or the UE receives an additional resume request from the BS, the UE may reuse the first encoder AI model that compresses CSI data (V data) into n bits to create compressed data (z data), and transmit the n-bit compressed data to the BS. In this case, the first encoder AI model may be equal to the first encoder AI model used before updating of the AE, or the first encoder AI model updated by the BS in the process of fine tuning of the AE.

As such, the BS instructs the UE to report CSI in the codebook method instead of compressing the CSI while the AI model included in the AE is being fine-tuned, thereby reducing a CSI compression error.

Figure 8:
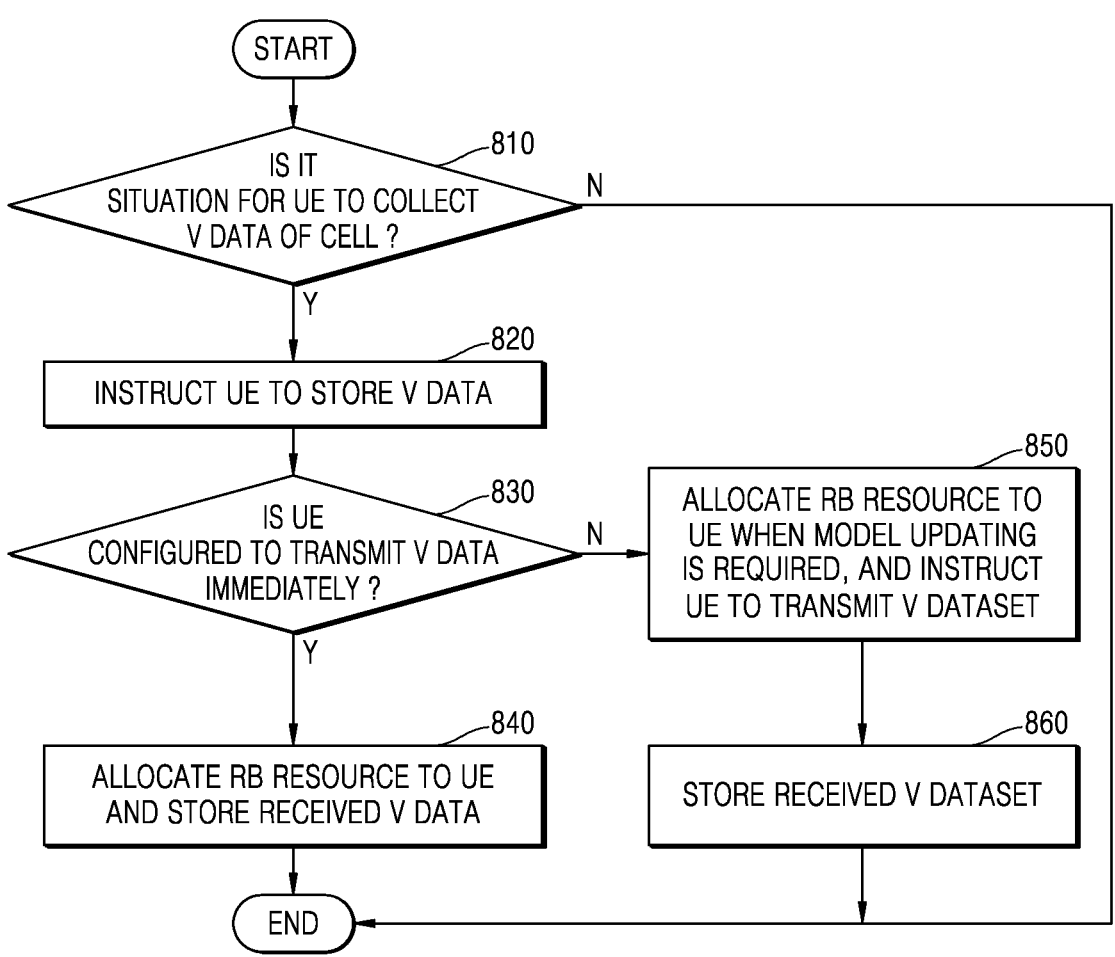
FIG. 8 illustrates an operation of a BS receiving data before compression from a UE in a wireless communication system, according to an embodiment.

FIG. 8 illustrates an operation of a BS receiving data before compression from a UE in a wireless communication system, according to an embodiment.

In step 810, the BS may determine whether it is a situation for the UE to collect CSI data before compression (V data) of the cell, e.g., whether the AE needs to be updated.

In step 820, when determining that it is the situation for the UE to collect CSI data before compression (V data), the BS may instruct the UE to store the V data. Operation 820 of FIG. 8 may correspond to operation 210 of FIG. 2, operation 410 of FIG. 4, or operation 510 or 530 of FIG. 5. When determining that it not is the situation for the UE to collect CSI data before compression (V data), the method ends.

An indicator, V collection indicator, with which the BS instructs the UE to store the V data, may be in 1 bit. For example, when the V collection Indicator has a value of 1, the V collection indicator indicates that compressed data (z data) is to be created based on V data for an RS and the V data is to be stored, and when the V collection Indicator has a value of 0, this indicates that z data is to be created based on V data for an RS and there is no need to store the V data. When the V collection Indicator is 1, a V collection number indicating to store V data for a certain number of RSs from now on may be further set, and the V collection number may be in N bits. When all the bits of the V collection number are 0, one piece of V data is to be stored, and the number of successive pieces of V data to be stored may be determined according to the other bit values.

The V collection indicator may also indicate that the UE is to store some pieces of V data. For example, a partition V indicator may indicate that some pieces of V data formed of K×Nt complex numbers are to be collected, where Nt is a number of BS antennas and K is a number of sub-bands. Inactive partition V indicator indicates collection of the entire matrix formed of K×Nt complex numbers, and active partition V indicator indicates collection of part of the V data corresponding to a partial range of K and a partial range of Nt.

In step 830, the BS may determine whether the UE is configured to immediately transmit V data, i.e., without delay. The UE may transmit the collected V data to the BS immediately after collecting the V data or at an additional request of the BS. How the UE transmits the V data to the BS may be determined based on parameter upload timing. When the upload timing is 0, this indicates a method of transmitting the V data immediately after collection of the V data, and when upload timing is 1, this indicates a method of transmitting the V data at the additional request of the BS after the BS determines that fine tuning of the AE is required.

When the UE is configured to transmit V data to the BS without delay, the method proceeds to step 840 in which the BS may allocate an RB for the UE and store V data received in the allocated resource. A case that the UE is configured to transmit V data to the BS without delay may correspond to the embodiment of the disclosure as illustrated in FIG. 4.

When the UE in step 830 is not configured to transmit V data to the BS without delay, the method proceeds to step 850, in which the BS may allocate an RB resource for the UE after determining that the AE needs to be updated, and request the UE to transmit V data. A case that the UE is configured to transmit V data to the BS at the request of the BS may correspond to the embodiment of the disclosure as illustrated in FIG. 5.

When the BS requests the UE to transmit V data through an additional message, this indicates in an All V indicator parameter whether all or part of the V data stored in the UE is to be transmitted. When All V indicator is 0, this indicates that all the V data stored in the UE is to be transmitted and when All V indicator is 1, this indicates that part of the V data stored in the UE is to be transmitted. When part of the V data stored in the UE is to be transmitted, consumption of frequency transmission resources may be reduced. In the meantime, when the BS indicates V data to be transmitted by using an index value corresponding to the V data, part of the V data may be transmitted even when the All V indicator is 1.

In step 860, the BS may store V data received from the UE and use the V data for updating the AE.

The BS may request the UE to collect V data periodically instead of via a triggering method. In the periodic method, information relating to an interval may be exchanged in the process of initial access, handover (HO) or the like, and afterward, the interval may be reset according to a change in environment. The BS may indicate to the UE whether the periodic method with RRC signaling or a MAC CE is to be used or the triggering method is to be used. For example, when parameter periodic indicator is 0, this indicates that the triggering method is used, and when parameter periodic indicator is 1, this indicates that the periodic method is used. In the periodic method, a default interval may be set in slots or in a time unit and the UE may collect V data at the set intervals without an additional request of the BS.

A portion of data before compression (V data) collected and stored in the UE may no longer be used for updating the AE due to a channel state change. In this case, the BS may request the UE to delete V data related to the corresponding index. For example, when a flush indicator is 0, this indicates that V data is not to be deleted, and when the flush indicator is 1, this indicates that part of V data is to be deleted. The BS may set a valid period (or a timer) for the collected V data to delete the data when the valid period has elapsed.

Figure 9:
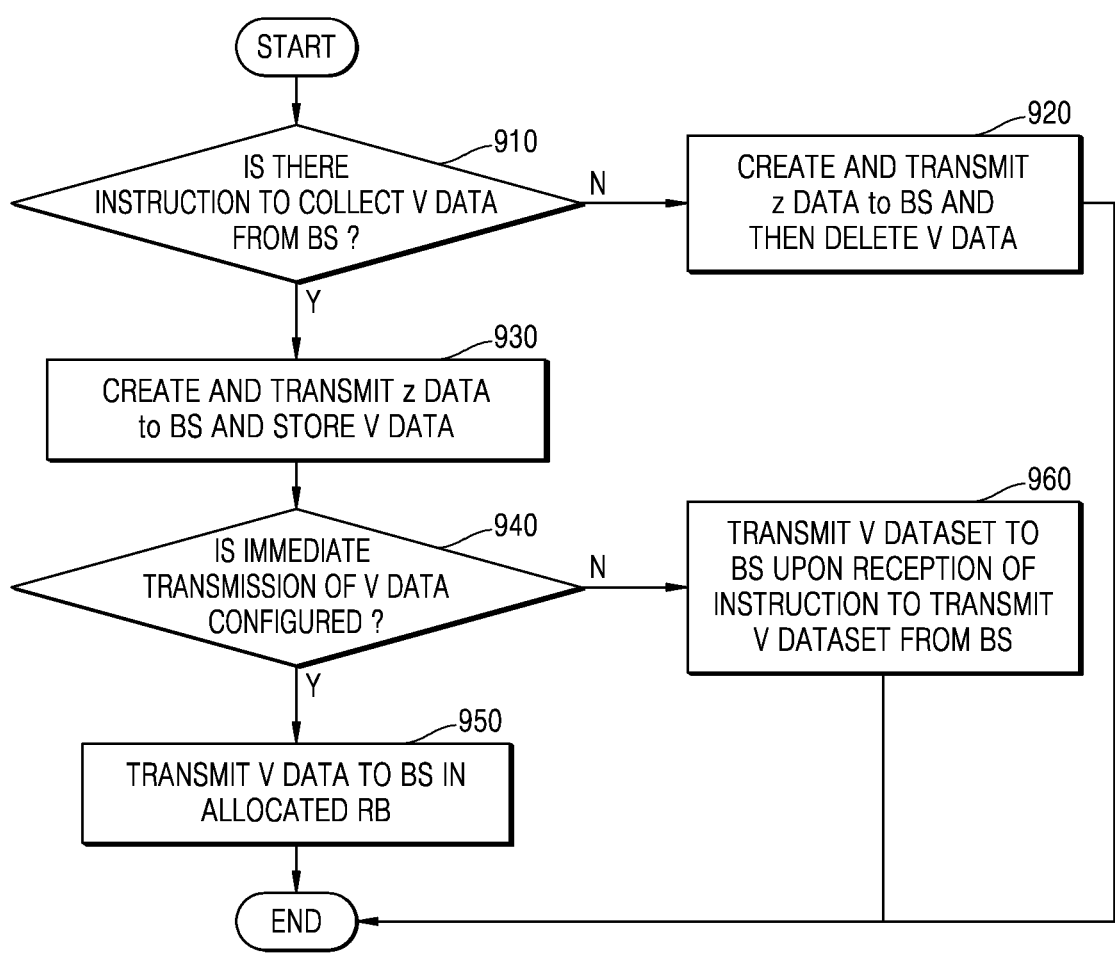
FIG. 9 illustrates an operation of a UE transmitting data before compression and compressed data to a BS in a wireless communication system, according to an embodiment.

FIG. 9 illustrates an operation of a UE transmitting data before compression (V data) and compressed data (z data) to a BS in a wireless communication system, according to an embodiment.

In step 910, the UE may determine whether there is an instruction from the BS to collect V data. The BS may determine whether it is a situation for the UE to collect CSI data before compression (V data) of the cell, e.g., whether the AE needs to be updated, and instruct the UE to collect V data.

When the BS does not instruct the UE to collect V data, the method proceeds to step 920, in which the UE may compress V data to create z data, transmit the z data to the BS, and delete the V data before compression for securing memory space.

When the BS instructs the UE to collect V data, the method proceeds to step 930, in which the UE may compress V data to create z data, transmit the z data to the BS, and store the V data before compression in the memory.

In step 940, the UE may determine whether the UE is configured to immediately transmit V data to the BS, without delay. The UE may transmit the collected V data to the BS immediately after collecting the V data or at an additional request of the BS. How the UE transmits the V data to the BS may be determined based on an upload timing parameter. When the upload timing is 0, this indicates a method of transmitting V data immediately after collection of the V data, and when the upload timing is 1, this indicates a method of transmitting the V data at the additional request of BS after determination of the BS that fine tuning of the AE is required.

When the UE is configured to transmit V data to the BS without delay, the method proceeds to step 950, in which the UE may transmit V data to the BS in allocated RBs. A case that the UE is configured to transmit V data to the BS without delay may correspond to the embodiment of the disclosure as illustrated in FIG. 4.

When the UE is not configured to transmit V data to the BS without delay, the method proceeds to step 960, in which the UE may transmit V data to the BS at the request of the BS to transmit V data. A case that the UE is configured to transmit V data to the BS at the request of the BS may correspond to the embodiment of the disclosure as illustrated in FIG. 5.

Figure 10:
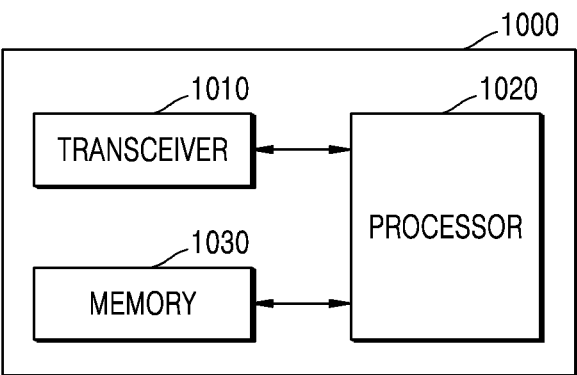
FIG. 10 illustrates a BS, according to an embodiment.

FIG. 10 is a schematic block diagram of a BS 1000 according to an embodiment.

Referring to FIG. 10, the BS 1000 may include a transceiver 1010, a processor 1020, and a memory 1030. The transceiver 1010, the processor 1020 and the memory 1030 of the BS 1000 may operate according to the aforementioned communication method of the BS 1000. Elements of the BS 1000 are not, however, limited thereto. For example, the BS 1000 may include more or fewer elements than described above. In addition, the transceiver 1010, the processor 1020, and the memory 1030 may be implemented in a single chip. The processor 1020 may include one or more processors.

A receiver and a transmitter of the BS 1000 are collectively referred to as the transceiver 1010, which may transmit or receive signals to or from a UE or a network entity. The signals to be transmitted to or received from the UE or the network entity may include control information and data. For this, the transceiver 1010 may include an RF transmitter for up-converting the frequency of a signal to be transmitted and amplifying the signal and an RF receiver for low-noise amplifying a received signal and down-converting the frequency of the received signal. However, this is merely an example of the transceiver 1010, and the elements of the transceiver 1010 are not limited to the RF transmitter and RF receiver.

The transceiver 1010 may perform functions for transmitting and receiving signals on a wireless channel. For example, the transceiver 1010 may receive a signal on a wireless channel, output the signal to the processor 1020 and transmit a signal output from the processor 1020 on a wireless channel.

The memory 1030 may store a program and data required for operation of the BS 1000, may store control information or data included in a signal obtained by the BS, and may include a storage medium such as a read only memory (ROM), a random access memory (RAM), a hard disk, a compact disc ROM (CD-ROM), and a digital versatile disk (DVD), or a combination of storage mediums. Alternatively, the memory 1030 may not be separately present but may be integrated into the processor 1020. The memory 1030 may include a volatile memory, a non-volatile memory, or a combination of the volatile memory and the non-volatile memory, and may provide the stored data at the request of the processor 1020.

The processor 1020 may control a series of steps for the BS 1000 to perform. For example, the processor 1020 may receive control signals and data signals through the transceiver 1010 and process the received control signals and data signals. The processor 1020 may transmit the processed control signal and data signal through the transceiver 1010. The processor 1020 may record data to the memory 1030 or read out data from the memory 1030. The processor 1020 may perform functions of a protocol stack requested by a communication standard, for which the processor 1020 may include at least one processor or microprocessor. Part of the transceiver 1010 and the processor 1020 may be referred to as a communication processor (CP).

The processor 1020 may include one or more processors including a universal processor such as a CPU, an AP, a digital signal processor (DSP), etc., a graphic processing unit (GPU), a vision processing unit (VPU), etc., or a dedicated AI processor such as a neural processing unit (NPU). For example, when the one or more processors are the dedicated AI processors, the dedicated AI processors may be designed in a hardware structure that is specific to dealing with a particular AI model.

The processor 1020 may instruct the UE through the transceiver 1010 to collect CSI data (V data), request the UE through the transceiver 1010 to transmit a CSI dataset (V dataset), receive a CSI dataset (V dataset) from the UE through the transceiver, and use the received CSI dataset (V dataset) to update an AE.

Figure 11:
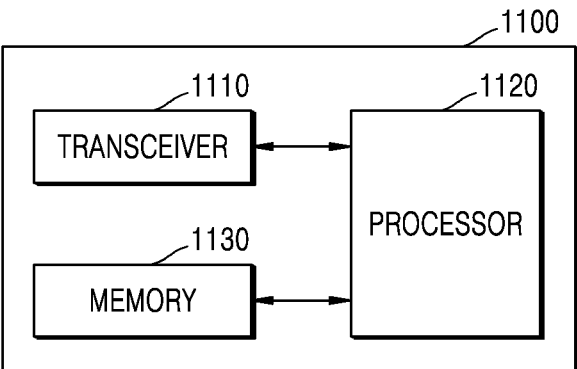
FIG. 11 illustrates a UE, according to an embodiment.

FIG. 11 is a schematic block diagram of a UE 1100, according to an embodiment.

Referring to FIG. 11, the UE 1100 may include a transceiver 1110, a processor 1120, and a memory 1130. Elements of the UE 1100 are not, however, limited thereto. For example, the UE 1100 may include more or fewer elements than those described above. The transceiver 1110, the processor 1120, and the memory 1130 may be implemented in a single chip.

The processor 1120 may include one or more processors. The one or more processors may include a universal processor such as a CPU, an AP, a digital signal processor (DSP), etc., a GPU, a vision processing unit (VPU), etc., or a dedicated AI processor such as a neural processing unit (NPU). For example, when the one or more processors are the dedicated AI processors, the dedicated AI processors may be designed in a hardware structure that is specific to handling a particular AI model.

The processor 1120 may control a series of steps for the UE 1100 to perform. For example, the processor 1120 may receive control signals and data signals through the transceiver 1110 and process the received control signals and data signals. The processor 1120 may transmit the processed control signal and data signal through the transceiver 1110, may control input data derived from the received control signal and data signal to be processed according to a predefined operation rule or AI model stored in the memory 1130, may record data to the memory 1130 or read out data from the memory 1130, and may perform functions of a protocol stack requested by a communication standard. The processor 1120 may include at least one processor, and part of the transceiver 1110 or the processor 1120 may be referred to as a CP.

The memory 1130 may store a program and data required for operation of the UE 1100. Furthermore, the memory 1130 may store control information or data included in a signal obtained by the UE 1100, may store predefined operation rules or an AI model used by the UE 1100, may include a storage medium such as a ROM, a RAM, a hard disk, a CD-ROM, and a DVD, or a combination of storage mediums, may not be separately present but integrated into the processor 1120, may include a volatile memory, a non-volatile memory, or a combination of the volatile memory and the non-volatile memory, and may provide the stored data at the request of the processor 1120.

The transceiver 1110 may refer to a transmitter and a receiver, and the transceiver 1110 of the UE 1100 may transmit or receive signals to or from a BS or a network entity. The signals may include control information and data. For this, the transceiver 1110 may include an RF transmitter for up-converting the frequency of a signal to be transmitted and amplifying the signal and an RF receiver for low-noise amplifying a received signal and down-converting the frequency of the received signal. Elements of the transceiver 1110 are not limited to the RF transmitter and RF receiver. In addition, the transceiver 1110 may receive a signal on a wireless channel, output the signal to the processor 1120, and transmit a signal output from the processor 1120 on a wireless channel.

Functions related to AI according to embodiments of the disclosure are operated through a processor and a memory. There may be one or more processors. The one or more processors may include a universal processor such as a CPU, an AP, a digital signal processor (DSP), etc., a GPU, a vision processing unit (VPU), etc., or a dedicated AI processor such as a neural processing unit (NPU). The one or more processors may control processing of input data according to a predefined operation rule or an AI model stored in the memory. When the one or more processors are the dedicated AI processors, they may be designed in a hardware structure that is specific to dealing with a particular AI model.

The predefined operation rule or the AI model may be made by learning, such that the predefined operation rule or the AI model established to perform a desired feature (or an object) is made when a basic AI model (or a deep learning model) is trained by a learning algorithm with a vast amount of training data. Such learning may be performed by a device in which AI is performed, or by a separate server and/or system. Examples of the learning algorithm may include but are not limited to supervised learning, unsupervised learning, semi-supervised learning, and reinforcement learning.

The AI model (or deep learning model) may be composed of a plurality of neural network layers. Each of the plurality of neural network layers may have a plurality of weight values and may perform neural network operation through operation between an operation result of the previous layer and the plurality of weight values. The plurality of weight values owned by the plurality of neural network layers may be optimized by learning results of the AI model. For example, the plurality of weight values may be updated to reduce or minimize a loss value or a cost value obtained by the AI model during a training procedure. An artificial neural network may include a deep neural network (DNN), such as a convolutional neural network (CNN), a recurrent neural network (RNN), a restricted Boltzmann machine (RBM), a deep belief network (DBN), a bidirectional recurrent DNN (BRDNN), or a deep Q-network, without being limited thereto.

Various embodiments of the disclosure may be implemented or supported by one or more computer programs, which are formed of computer-readable program codes and may be embodied on a computer-readable medium. Throughout the specification, the terms 'application' and 'program' may refer to one or more computer programs, software components, instruction sets, procedures, functions, objects, classes, instances, associated data, or part thereof, suitably implemented in computer-readable program codes. The computer-readable program codes may include various types of computer codes including source codes, target codes and executable codes. The computer-readable medium may include various types of medium accessible by a computer, such as a ROM, RAM, a hard disk drive (HDD), a compact disc (CD), a digital video disc (DVD) or other various types of memory.

The computer-readable storage medium may be provided in the form of a non-transitory storage medium. The non-transitory storage medium is a tangible device, which may exclude wired, wireless, optical, or other communication links to transmit the transitory electric or other signals. The non-transitory storage medium does not discriminate between an occasion when data is semi-permanently stored and an occasion when data is temporarily stored in the storage medium. For example, the non-transitory storage medium may include a buffer that temporarily stores data. The computer-readable medium may be an arbitrary available medium that may be accessed by the computer, including volatile, non-volatile, removable, and non-removable mediums. The computer-readable medium includes a medium for storing data permanently, and a medium for storing data which can be overwritten afterward, i.e., a rewritable optical disk or an erasable memory device.

The methods disclosed herein may be provided in a computer program product, such as a commercial product that may be traded between a seller and a buyer. The computer program product may be distributed in the form of a storage medium, through an application store, directly between two user devices (e.g., smart phones), or online (e.g., downloaded or uploaded). In online distribution, at least part of the computer program product (e.g., a downloadable app) may be at least temporarily stored or arbitrarily created in a storage medium that may be readable to a device such as a server of the manufacturer, a server of the application store, or a relay server.

Several embodiments have been described, but a person of ordinary skill in the art will understand and appreciate that various modifications can be made without departing the scope of the disclosure. For example, the aforementioned method may be performed in a different order, and/or the aforementioned systems, structures, devices, circuits, etc., may be combined in different combinations from what is described above, or replaced or substituted by other components or equivalents thereof, to obtain appropriate results. Thus, it will be apparent to those of ordinary skill in the art that the disclosure is not limited to the embodiments described, but can encompass not only the appended claims but the equivalents. For example, an element described in the singular form may be implemented as being distributed, and elements described in a distributed form may be implemented as being combined.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. A method performed by a base station (BS) updating an autoencoder (AE) for channel state information (CSI) feedback in a wireless communication system, the method comprising:

transmitting, to a user equipment (UE), a data transmission request message requesting the UE to transmit at least one piece of data before compression corresponding to compressed data;

receiving, from the UE, the at least one piece of the data before the compression in response to the data transmission request message; and updating an autoencoder (AE), based on the received at least one piece of the data before compression.

2. The method of claim 1, wherein the AE includes a first encoder artificial intelligence (AI) model configured to compress channel state information (CSI) data and a decoder AI model configured to reconstruct the compressed CSI data, and wherein updating the AE comprises fine tuning at least one of the first encoder AI model or the decoder AI model.

3. The method of claim 2, further comprising transmitting, to the UE, AE update start time information, duration information of the updating, and identification information for a second encoder AI model to be used for a period during which the updating of the AE is performed.

4. The method of claim 2, further comprising transmitting, to the UE, AE update start time information, duration information of the updating, and identification information for a codebook to be used for a period during which the updating of the AE is performed.

5. The method of claim 1, wherein a data collect instruction message instructing the UE to collect the data before compression is transmitted to the UE when it is determined, based on cell-specific information, that there is a change in channel characteristics.

6. The method of claim 1, wherein a data collect instruction message instructing the UE to collect the data before compression comprises an indicator including identification information of the data before compression to be collected, and wherein the data collect instruction message is transmitted to the UE in a physical downlink control channel (PDCCH).

7. The method of claim 1, further comprising determining a data collection interval, based on a degree of changing of the channel characteristics over time, wherein a data collect instruction message instructing the UE to collect the data before compression comprises data collection interval information, and wherein the data collect instruction message is transmitted to the UE by radio resource control (RRC) signaling.

8. The method of claim 1, wherein a data collect instruction message instructing the UE to collect the data before compression comprises a data transmission request message requesting the UE to transmit the collected data before compression immediately after the data before compression is collected.

9. The method of claim 1, wherein a data collect instruction message instructing the UE to collect the data before compression comprises a data store instruction message instructing the UE to store the collected data before compression, and wherein the method further comprises transmitting, to the UE, the data collect instruction message.

10. A base station (BS) for updating an autoencoder (AE) for channel state information (CSI) feedback in a wireless communication system, the BS comprising:

a transceiver; and at least one processor, wherein the at least one processor is configured to:

transmit, to a user equipment (UE) through the transceiver, a data transmission request message requesting the UE to transmit at least one piece of data before compression corresponding to compressed data, receive, from the UE through the transceiver, the at least one piece of the data before the compression in response to the data transmission request message, and update an autoencoder (AE), based on the received at least one piece of the data before compression.

11. A method performed by a user equipment (UE) communicating with a base station (BS) for updating an autoencoder (AE) for channel state information (CSI) feedback in a wireless communication system, the method comprising:

creating compressed data;

collecting data before compression corresponding to the compressed data;

receiving, from the BS, a data transmission request message requesting transmission of at least one piece of the data before compression;

transmitting, to the BS, the at least one piece of the data before the compression in response to the data transmission request message; and receiving, from the BS, an autoencoder (AE) updated based on the at least one piece of the data before compression.

12. The method of claim 11, wherein the AE comprises a first encoder artificial intelligence (AI) model configured to compress channel state information (CSI) data and a decoder AI model configured to reconstruct the compressed CSI data, and wherein the updated AE comprises at least one of the fine-tuned first encoder AI model or the fine-tuned decoder AI model.

13. The method of claim 12, further comprising receiving, from the BS, AE update start time information, duration information of the updating, and identification information for a second encoder AI model to be used for a period during which the updating of the AE is performed.

14. The method of claim 12, further comprising receiving, from the BS, AE update start time information, duration information of the updating, and identification information for a codebook to be used for a period during which the updating of the AE is performed.

15. The method of claim 11, wherein a data collect instruction message instructing the UE to collect the data before compression is received from the BS when it is determined based on cell-specific information that there is a change in channel characteristics.

16. The method of claim 11, wherein a data collect instruction message instructing the UE to collect the data before compression comprises an indicator including identification information of the data before compression to be collected, and wherein the data collect instruction message is received from the BS in a physical downlink control channel (PDCCH).

17. The method of claim 11, wherein a data collect instruction message instructing the UE to collect the data before compression comprises data collection interval information, and is received from the BS by radio resource control (RRC) signaling, and wherein the data collection interval information is determined based on a degree of changing of channel characteristics over time.

18. The method of claim 11, wherein a data collect instruction message instructing the UE to collect the data before compression comprises a data transmission request message requesting transmission of the collected data before compression to the BS immediately after collection of the data before collection.

19. The method of claim 11, wherein a data collect instruction message instructing the UE to collect the data before compression comprises a data store instruction message instructing to store the collected data before compression, and wherein the method further comprises receiving, from the BS, the data collect instruction message.

* * * * *